US009667112B2

United States Patent
Zhang et al.

(10) Patent No.: US 9,667,112 B2
(45) Date of Patent: May 30, 2017

(54) ROTOR SLOT LINERS

(71) Applicant: General Electric Company, Schenectady, NY (US)

(72) Inventors: Wei Zhang, Ballston Lake, NY (US); Xiaochuan Jia, Vandalia, OH (US); Charles T. Sigler, Vandalia, OH (US); Xiaomei Fang, Glastonbury, CT (US); Hao Huang, Vandalia, OH (US); David Dimitri Karipides, Casstown, OH (US)

(73) Assignee: General Electric Company, Niskayuna, NY (US)

( * ) Notice: Subject to any disclaimer, the term of this patent is extended or adjusted under 35 U.S.C. 154(b) by 372 days.

(21) Appl. No.: 14/471,306

(22) Filed: Aug. 28, 2014

(65) Prior Publication Data
US 2016/0065024 A1 Mar. 3, 2016

(51) Int. Cl.
*H02K 3/34* (2006.01)
*H02K 15/10* (2006.01)
*H02K 3/30* (2006.01)

(52) U.S. Cl.
CPC .............. *H02K 3/345* (2013.01); *H02K 3/30* (2013.01); *H02K 15/10* (2013.01)

(58) Field of Classification Search
CPC  B29C 70/88; B32B 27/18; B32B 5/26; B32B 27/12; B32B 27/34; H02K 3/24; H02K 3/30; H02K 1/12; H02K 15/04; H02K 15/10; H02K 9/22
USPC ........................................................ 310/215
See application file for complete search history.

(56) References Cited

U.S. PATENT DOCUMENTS

| 4,087,712 | A | 5/1978 | Mosimann et al. | |
|---|---|---|---|---|
| 5,319,269 | A | 6/1994 | Bryant | |
| 5,710,475 | A | * 1/1998 | Irwin | B32B 27/18 174/120 SR |
| 5,982,056 | A | 11/1999 | Koyama et al. | |
| 6,551,422 | B1 | * 4/2003 | O'Connor | B08B 3/00 134/29 |
| 7,015,396 | B2 | 3/2006 | Wada et al. | |
| 8,030,818 | B2 | 10/2011 | Nelson et al. | |
| 8,664,817 | B2 | 3/2014 | Rumbaugh et al. | |
| 2006/0071570 | A1 | * 4/2006 | Smigelski | H02K 3/345 310/214 |

(Continued)

FOREIGN PATENT DOCUMENTS

DE  102010002721  11/2011
FR  2440640 A1  5/1980

(Continued)

OTHER PUBLICATIONS

Unofficial English Translation of Japanese Office Action issued in connection with corresponding JP Application No. 2015162358 on Sep. 20, 2016.

(Continued)

*Primary Examiner* — Tran Nguyen
(74) *Attorney, Agent, or Firm* — Nitin N. Joshi

(57) ABSTRACT

A slot liner for a rotor assembly in one embodiment includes a metallic support member and a coating. The coating is disposed on at least one side of the metallic support member, and includes a mixture of a filler and a polyimide resin. The filler is a high thermal conductivity electrical insulating (HTCEI) filler, and includes particles of at least one of boron nitride, aluminum nitride, or a diamond material.

17 Claims, 6 Drawing Sheets

(56) References Cited

U.S. PATENT DOCUMENTS

| | | |
|---|---|---|
| 2009/0174279 A1 | 7/2009 | Sheaffer et al. |
| 2009/0182088 A9 | 7/2009 | Irwin et al. |
| 2011/0012474 A1 | 1/2011 | Levit et al. |
| 2012/0108122 A1 | 5/2012 | Elia et al. |
| 2012/0169172 A1 | 7/2012 | Anderton et al. |
| 2013/0069478 A1 | 3/2013 | Hamer |
| 2013/0207395 A1 | 8/2013 | Huang et al. |

FOREIGN PATENT DOCUMENTS

| | | |
|---|---|---|
| GB | 633126 A | 12/1949 |
| GB | 2518049 A | 3/2015 |
| JP | 4841202 A | 6/1973 |
| JP | 2005184919 A | 7/2005 |
| JP | 2009165346 A | 7/2009 |
| WO | 2004008603 | 1/2004 |
| WO | 2008145190 | 12/2008 |
| WO | 2012158236 | 11/2012 |

OTHER PUBLICATIONS

GB Search Report and Written Opinion issued in connection with corresponding GB Application No. 1514752.3 on Feb. 29, 2016.

Canadian Office Action issued in connection with corresponding CA Application No. 2900195 on May 10, 2016.

Fuchs, "Integration of Tough and Homogenous Layers Inproves Breakdown Stremght of Gfrp Laminated Rotor Slot Liners in Large Turbogenerators", Electrical Insulation, IEEE Transactions on (vol. EI-12 , Issue: 2), pp. 171-175, Apr. 1977.

Miller et al., "Turbine generator stator slot thermal conductivity", Electrical Insulation Conference and Electrical Manufacturing & Coil Winding Conference, 1999. Proceedings, IEEE, 1999, pp. 65-69, Cincinnati, OH.

* cited by examiner

ROTOR SLOT LINERS

BACKGROUND

Electric power systems, such as generators or motors, may be used to provide electrical power from a mechanical input (e.g., rotation of a shaft used to provide electrical power by a generator), or to provide a mechanical output from input electrical power (e.g., use of electrical power to rotate a shaft by a motor). These devices may be used in applications, such as aircraft, where it is desirable to provide a large amount of power while minimizing the amount of space occupied and/or weight of the power system.

Such power systems may route electrical current through windings that pass through slots of stators and/or rotors. To prevent the passage of electrical charge from the windings to the slots, slot liners may be employed. As the electric current passes through the windings, the windings may be heated. However, conventional slot liners provide limited heat transfer ability to remove heat from the windings. Various power systems may be limited in the available power output by the ability to remove heat from the windings as electric current passes through the windings.

For example, for high performance motor or generators (e.g., generator for use in aircraft), power density may be an important consideration or aspect of motor or generator design. Power density is largely related to heat transfer effectiveness. Heat transfer of the rotor may be limited by various electrically and thermally insulating materials such as conventional slot liners, which limit the heat transfer from the copper wire (e.g., to a cooling loop associated with the rotor), and thereby limit the power density.

BRIEF DESCRIPTION

In one embodiment, a slot liner is provided for a rotor assembly of a power system. The slot liner includes a metallic support member and a coating disposed on at least one side of the metallic support member. The coating includes a mixture of a polyimide resin and a high thermal conductivity electrical insulating (HTCEI) filler. The HTCEI filler includes particles of at least one of boron nitride, aluminum nitride, or a diamond material.

In another embodiment, a rotor assembly for a power system is provided that includes a rotor core, windings, and slot liners. The rotor core has arms extending from a central portion and defining slots therebetween. The windings pass through the slots. The slot liners are disposed in the slots and interposed between the windings and the rotor core. The slot liners include a metallic support member and a coating disposed on at least one side of the metallic support member. The coating includes a mixture of a polyimide resin and a high thermal conductivity electrical insulating (HTCEI) filler. The HTCEI filler includes particles of at least one of boron nitride, aluminum nitride, or a diamond material.

In another embodiment, a method (e.g., a method for forming a slot liner) is provided. The method includes providing a metallic support member, a polyimide resin precursor, and a high thermal conductivity electrical insulating (HTCEI) filler, the HTCEI filler including particles of at least one of boron nitride, aluminum nitride, or a diamond material. The method also includes mixing the polyimide resin precursor and the HTCEI filler to provide a coating, and coating at least one side of the metallic support member with the coating to provide a liner material. Further, the method includes curing the liner material.

DETAILED DESCRIPTION

Figure 1:
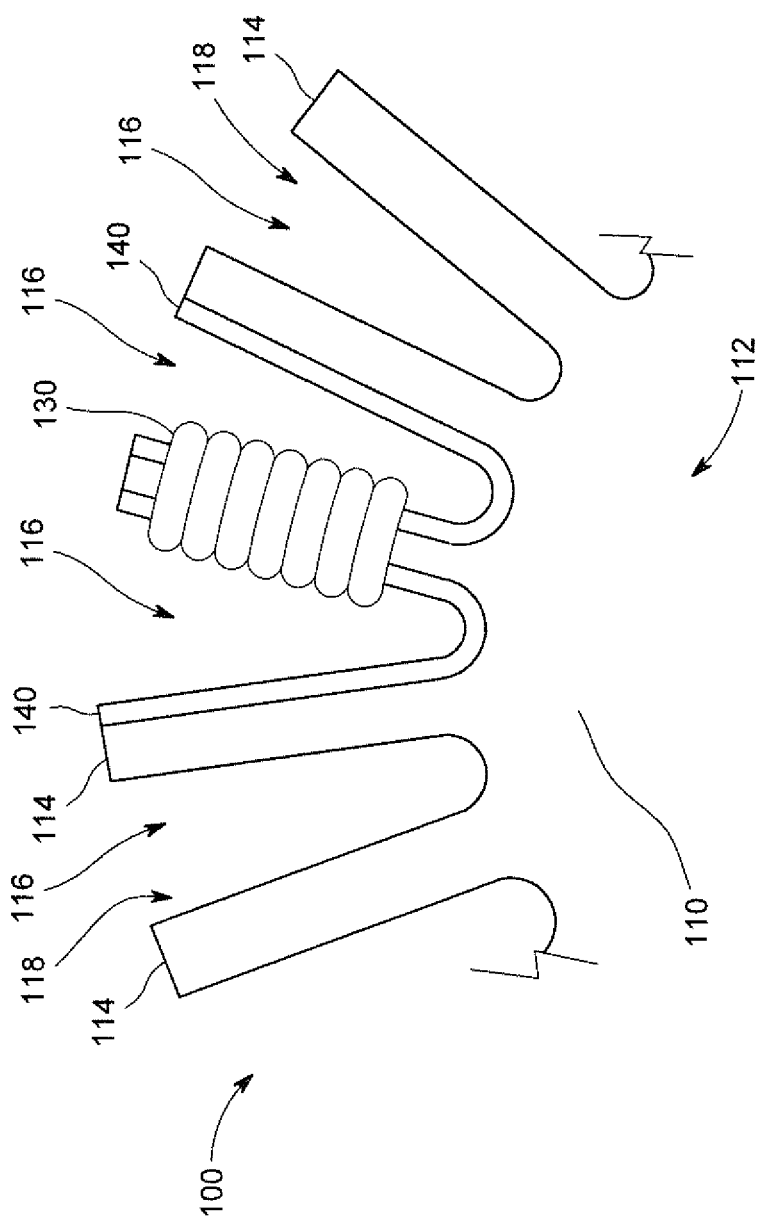
FIG. 1 is an end view of a rotor assembly in accordance with various embodiments.

Various embodiments will be better understood when read in conjunction with the appended drawings. To the extent that the figures illustrate functional diagrams of the functional blocks of various embodiments, the functional blocks are not necessarily indicative of the division between hardware circuitry. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Generally, various embodiments provide for improved heat transfer and power density of power systems such as motors and generators, for example by improving heat transfer from windings to a rotor via the slot liners. Various embodiments provide slot liner materials for use at high temperatures that provide relatively high thermal conductivity while providing relatively high electrical insulation to provide improved heat transfer and/or improved high temperature capability for high power density electrical machines (e.g., motors or generators). Various embodiments may be particularly well suited for use with the rotors of direct current (DC) electric machines or power systems such as DC motors or DC generators.

Generally, a slot liner may be employed in power systems (such as motors or generators) to electrically insulate a conductor (e.g., copper wire or winding) from a rotor body or core. However, conventional slot liners made of materials such as NOMEX® paper, KAPTON® film, or the like may provide relatively high dielectric strength, but lack relatively high heat transfer capabilities. Conventional slot liner materials may have relatively low thermal conductivities, for example on the order of about 0.1 to 0.15 or 0.2 W/(m*K) (where W is watts, m is meters, and K is degrees Kelvin). Other electrical insulation materials conventionally used in conjunction with electric machines or power systems such as motors or generators may also be thermally insulating, or have poor thermal conductivity. For example, insulation varnish (e.g., epoxy or polyester, among others) may have relative low thermal conductivities, for instance in the range of 0.15 to 0.2 W/(m*K) Power to weight (or power density) may be an important aspect or characteristic for high performance electric machines or power systems, such as generators for use in aircraft, and limitations regarding the ability to transfer heat out of the windings may be a limiting factor on the power density.

Various embodiments provide for improved thermal conductivity of materials used to produce slot liners, improving the overall heat transfer capability of power systems or electrical machines and power density. Various embodiments provide a hybrid slot liner that includes a metal substrate or support member (e.g., soft tempered stainless steel) and a thermally conductive coating that includes, for example, a polyimide material. Within the polyimide of the coating, the coating includes thermally conductive particles (e.g., boron nitride, aluminum oxide) disposed through the coating such that the overall hybrid material or construction has a relatively high thermal conductivity, for example a thermal conductivity of 10 times or more than certain conventional slot liner materials.

Various embodiments provide slot liners that may be utilized effectively with rotors, with a metallic support layer providing relatively high mechanical strength to the slot liner for use in the rotor, which may rotate at relatively high angular velocities. Various embodiments may be particularly useful in DC applications, but may present challenges in alternating current (AC) applications. For example, the use of metal as a substrate or support member in the slot liner may result in issues relating to increased eddy current loss due to the metal in the substrate or support member in AC applications. Generally, in various embodiments, the windings (e.g., copper wires) are maintained in contact with a side of the slot liner that is coated or covered with the filler (e.g., polyimide with boron nitride particles), while the metallic support member or substrate is in contact with the rotor core surface, to electrically insulate the rotor core surface from the windings. Further, in various embodiments, one or more edges (e.g., uncoated edges) of the slot liner may be covered with an electrical insulator, such as an insulation tape made with, for example, NOMEX® or KAPTON®, to help prevent electrical breakdown of the slot liner. The insulation tape may be applied with pressure sensitive adhesive.

As discussed herein, various embodiments provide a hybrid slot liner utilizing a metallic backing layer. The metallic backing layer, which may be, for example, between 2 and 3 mils thick in some embodiments, provides mechanical strength. Use of a hybrid slot liner as described herein provide a cost-effective (e.g., relatively low development, material, and/or manufacturing costs) slot liner having beneficial mechanical and thermal properties. The metallic backing layer may be configured to be thin enough so that the slot liner is flexible for forming into a shape to be placed in a slot, while strong enough to effectively resist tearing during forming and/or use. In various embodiments, the slot liner may be utilize a metallic backing layer made of soft tempered stainless steel, brass, or copper, for example. To help ensure adhesion of the coating to the metallic substrate, the metallic substrate may be cleaned and treated prior to coating. For example, for stainless steel metallic support members, the support member may be washed using an alkaline solution, rinsed one or more times using deionized water, and dried prior to applying the coating.

Various embodiments utilize a thermally conductive polyimide coating applied to the metallic support member. The coating may be utilized to provide electrical insulation between the windings and the rotor core, while providing effective thermal conductivity. In some embodiments, the coating may be between 3 and 5 mils thick. Thermally conductive particles (e.g., thermally conductive inorganic particles such as boron nitride, aluminum oxide, or the like) may be contained within a resin (e.g., a polyimide resin). In some embodiments, particles may have a size between 50 nanometers and 50 microns. In some embodiments, particles may have a size between 10 nanometers and 100 microns. Proper mixing of the particles and a precursor resin (e.g., a polyimide precursor such as polyamic acid) helps insure good dispersion and uniformity of the coating. The coating may then be cast or coated onto the metallic backing material using a casting machine such as a knife blade coater, dip coater, or slot die coater, with the slot liner then cured to imidize the coating (e.g., the resin of the coating). The cure temperature in some embodiments, for example, may be up to 300 degrees Celsius.

Various embodiments provide rotor assemblies utilizing slot liners disclosed herein, allowing heat generated by copper wires or windings of a rotor in a motor or generator to be more readily transferred out of the copper wires or windings, thereby lowering the operating temperature of the machine. Further, if lower operating temperature is not desired or required, additional power output may be provided by utilizing various embodiments of slot liners disclosed herein instead of using conventional slot liners.

At least one technical effect of various embodiments includes improved heat transfer of heat away from windings of a rotor. At least one technical effect of various embodiments includes improved power density of motors and/or generators. At least one technical effect of various embodiments is the provision of a slot liner material having about 10 times higher thermal conductivity than conventional slot liner materials. At least one technical effect of various embodiments is providing a slot liner material having a combination of relatively high thermal conductivity, relatively high electrical insulation, and good mechanical properties for use with a rotor, while providing for high temperature use.

FIG. 1 is an end view of a rotor assembly 100 formed in accordance with various embodiments. The depicted rotor assembly 100 includes rotor core 110, windings 130, and slot liners 140. For clarity and ease of illustration, only a portion of the rotor core 110 is shown in FIG. 1, and the rotor assembly 100 is shown in a partially assembled condition (e.g., as seen in FIG. 1, not all slots have slot liners, and not all windings have been added). Generally, the windings 130 (e.g., copper conductors such as wires) are wound about portions of the rotor core 110 and used to conduct electric current to provide for relative movement of the rotor assembly with respect to a stator assembly when used with a motor, or to provide for the transmission of current generated when the rotor assembly 100 is rotated relative to a stator assembly when used with a generator. The slot liners 140 are interposed between the windings 130 and the rotor core 110 of the rotor assembly 100, and electrically insulate the rotor core 110 from the windings 130. In the illustrated embodiment, as discussed herein, the slot liners 140 are configured to provide for a relatively high thermal conductivity to provide for improved heat transfer of heat away from the windings 130 to the rotor core 110 of the rotor assembly 100. Heat may be transferred out of the rotor core 110, for example by using a heat sink and/or cooling system (e.g., a system including fins and/or a circulating cooling fluid through the rotor shaft, among others) operatively coupled to the rotor core 110. The general relationship between the rotor assembly 100 and other components or aspects of a power system (e.g., motor or generator) is depicted in FIG. 2.

Figure 2:
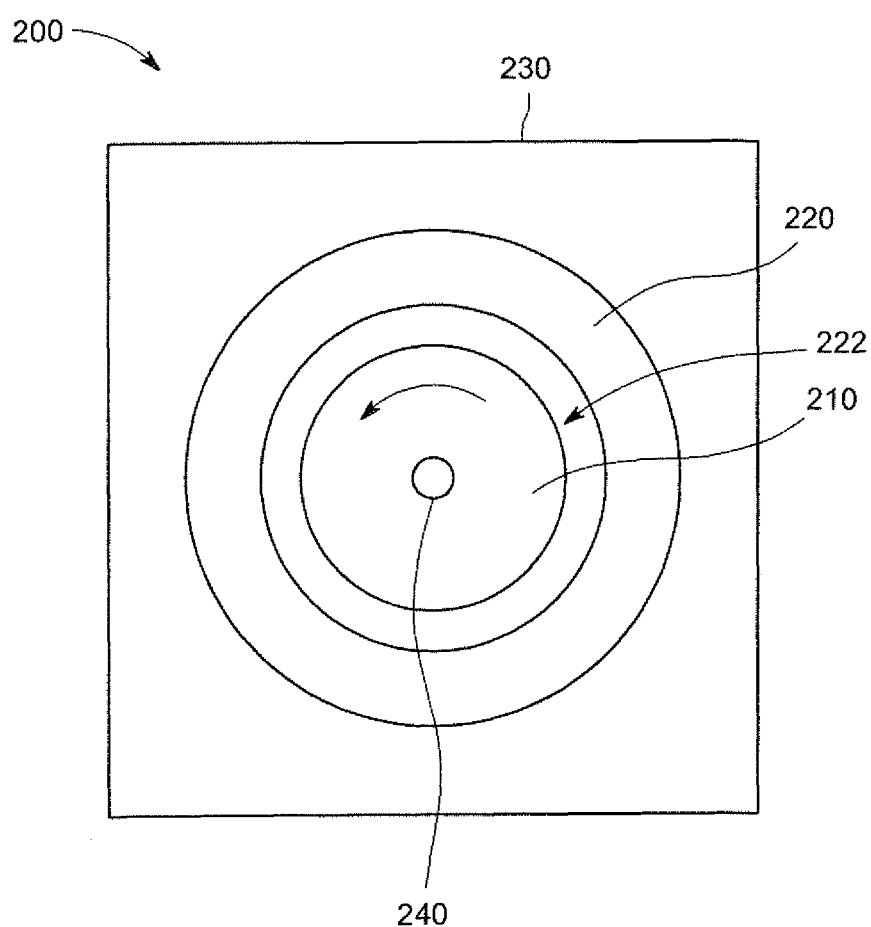
FIG. 2 is a schematic diagram of a power system in accordance with various embodiments.

FIG. 2 provides a schematic diagram of a power system 200 in accordance with various embodiments. The power system 200 includes a rotor assembly 210 (which may be generally similar in various respects to the rotor assembly 100 discussed herein), a stator assembly 220, a housing 230, and a shaft 240. The power system 200 may be configured as a generator or as a motor. In various embodiments, the power system 200 may be configured for direct current (DC) operation (e.g., the metal in the slot liners will not result in significant eddy current losses in DC applications).

Generally, the rotor assembly 210 is configured to be disposed within a bore 222 or central opening of the stator assembly 220, and to rotate with respect to the stator assembly 220. When the power system 200 is operated as a motor, electric current passing through windings of the rotor assembly 210 and/or windings of the stator assembly 220 cause a rotation of the rotor assembly 210 relative to the stator assembly 220. When the power system 200 is operated as a generator, a rotation of the rotor assembly 210 with respect to the stator assembly 220 causes the generation of an electric current within the windings of the rotor assembly 210 and/or the stator assembly that may be output. The electric current may be output by the generator for use by one or more external (e.g., external to the power system 200) devices and/or systems.

The housing 230 in the illustrated embodiment provides support and mounting for the stator assembly 220, helping maintain the stator assembly 220 in a stationary position while the rotor assembly 210 rotates. The housing 230 may also provide mounting features, for example, one or more bearings, for mounting the rotor assembly 210. Further, the depicted housing 230 is configured to act as a heat sink or to otherwise provide heat transfer from the stator assembly 220. For example, the housing 230 may be thermally coupled to the stator assembly 220, and include fins and/or a fluid cooling system to dissipate heat provided by the stator assembly 220 to the housing 230. Heat generated in the windings of the stator assembly 220 may thus be transferred from the windings to a stator via slot liners, then from the stator to the housing 230, and from the housing 230 to an external source or environment (e.g., via fins and/or a cooling fluid). Further, the rotor assembly 210 may also be operably coupled to a heat sink or other cooling system to provide heat transfer from the rotor assembly 210. For example, the rotor assembly 210 may be coupled to cooling system that includes fins and/or a fluid cooling arrangement to dissipate heat provided by the rotor assembly 210. Heat generated in the windings of the rotor assembly 210 may thus be transferred from the windings to a rotor (e.g., rotor core) via slot liners (e.g., slot liners 140), then from the rotor to an external source or environment (e.g., via fins and/or a cooling fluid). Improving heat transfer (e.g., by improving thermal conductivity of the slot liners 140) in various embodiments allows for improved power density, for example.

The shaft 240 is operably coupled to the rotor assembly 210 and is configured to rotate with the rotor assembly 210. The shaft 240 is configured to facilitate the conversion of mechanical power (e.g., rotation) to electrical power (e.g., current) or vice versa. When the power system 200 is operated as a generator, the shaft 240 is used to provide a rotational input to the power system 200 that is used to generate an electric current. When the power system 200 is operated as a motor, the shaft 240 is used to output a rotation for use by a system coupled to the power system 200.

Returning to FIG. 1, the rotor core 110 includes arms 114 extending from a central portion 112 of the rotor core 110. The rotor core 110 may be made of metal (e.g., a lamination of metal layers), and sized and configured to be accepted by a bore of a stator assembly (not shown in FIG. 1; see FIG. 2). The arms 114 are configured to provide structures around which the windings 130 may be wrapped or otherwise mounted. Slots 116 are defined between the arms 114. The slots 116 are configured to accept the slot liners 140, and to provide space to be occupied by the windings 130 when the windings 130 are wrapped about the arms 114. The windings 130 wrapped about a given arm 114 pass through the slots 116 on either side of the particular arm 114. As seen in FIG. 1, the slots 116 have slot openings 118 that extend toward an exterior of the rotor core 110 (e.g., toward a stator). The arrangement of the various aspects of the rotor assembly 100 (e.g., annular ring, arms, slots) is provided by way of example for illustrative purposes in FIG. 1. It should be noted that the particular geometry or configuration (e.g., size, shape, orientation, number of a given component or aspect, among others) employed may vary in different embodiments. For example, the slots 116 are depicted in FIG. 1 as having a generally V-shaped profile with a rounded bottom; however, other shapes, such as U-shaped, may be employed, with rounded and/or sharp bends (or a combination thereof). In some embodiments, the slot liners 140 may be pre-formed before insertion into the slots 116, while in other embodiments, the slot liners 140 may be bent or otherwise formed during insertion into the slots 116.

The slot liners 140 are disposed in the slots 116, and are interposed between the windings 130 and the rotor core 110 (e.g., interposed between the windings 130 and the arms 114 of the rotor core 110). The slot liners 140 are configured to electrically insulate the rotor core 110 from the windings 130. In the illustrated embodiments, the slot liners 140 are also configured to provide improved heat transfer from the windings 130 to the rotor core 110 relative to conventional slot liners. The depicted slot liners 140 are configured to have a relatively high thermal conductivity. For example, the slot liners 140 may have a thermal conductivity of 1.5 W/(m*K) or higher in various embodiments. The slot liners 140 are shown as being generally flush with the ends of the arms 114 or slots 116, but may extend beyond the ends of the arms 114 or slots 116 in various embodiments in one or more directions. Generally, both the metallic support layer and coating of the slot liner 140 provide relatively high thermal conductivity, and the coating provides a desired amount of electrical insulation.

Figure 3:
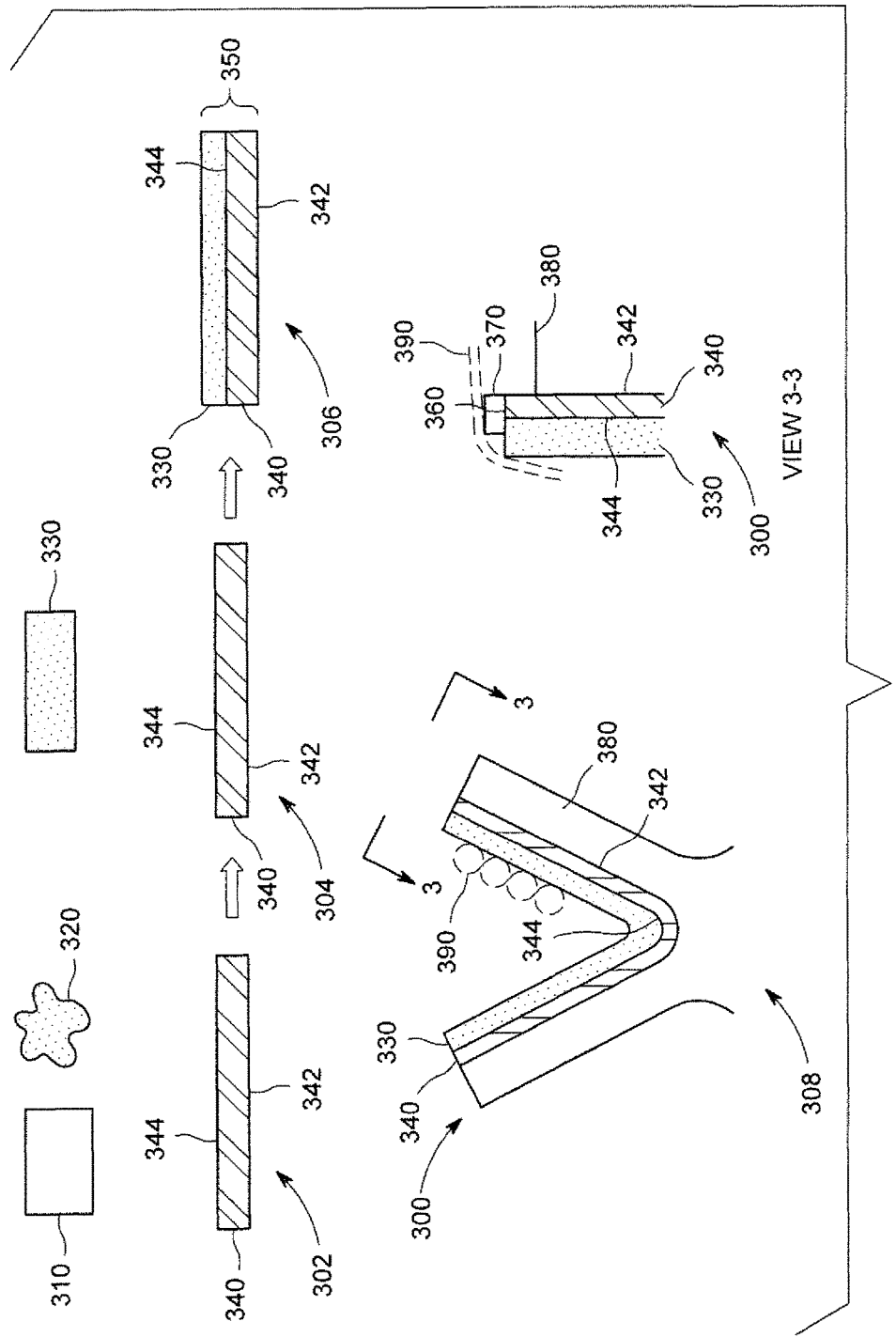
FIG. 3 illustrates a slot liner and formation thereof in accordance with various embodiments.

FIG. 3 illustrates various aspects of a slot liner 300 as well as various stages in the production and/or formation of the slot liner 300. The slot liner 300 may be substantially similar to the slot liner 140 discussed in connection with FIG. 1. The depicted slot liner 300 includes a metallic support member 340, and a coating 330. The coating 330 is disposed on at least one side of the metallic support member 340. In the illustrated embodiment, the coating 330 is disposed on only one side of the metallic structural member 340. In other embodiments, the coating 330 may be disposed on both sides and/or one or more edges of the metallic support member 340.

The metallic support member 340 is configured to provide support and mechanical reliability for the slot liner 300. Slot liners for use with rotors may require improved mechanical strength or reliability than slot liners for use with stators due to the rotation of the rotor, for example. The particular materials used for the metallic support member 340, as well as the arrangement (e.g., thickness) may be configured for a particular application (e.g., size of slot, geometry of slot, demands of particular generator or motor, or the like). The material used for the metallic support structural member 340 may be selected to provide a desired mechanical strength and/or durability or reliability. For example, in some embodiments, the metallic support member may be formed from stainless steel. The stainless steel may be 316 grade stainless steel, and may receive heat treatment to provide a soft temper. Generally, the metallic support member 340 may be selected to provide a desired flexibility for forming the slot liner 300 and/or insertion of the slot liner 300 into a slot, while also providing resistance to tearing during installation and/or forming, and a desired mechanical strength or reliability. In some embodiments, as additional examples, copper or brass may be utilized for the metallic support member 340. As further examples, in various embodiments, nickel alloys or cobalt alloys may provide sufficiently high strength, flexibility, and heat conduction for use as the metallic support member 340. However, it may be noted that metallic support members made with such materials as aluminum may not provide a desired strength at the relatively low thicknesses (e.g., 2 mil) utilized in various embodiments, or may tear too easily during forming or installation. As seen in FIG. 3, the metallic support member 340 has a first side 342 and second side 344 disposed opposite each other. The coating 330 may be applied to one or both of the first side 342 and second side 344 in various embodiments. In the illustrated embodiment, the coating 330 is applied to the second side 344, with the first side 342 configured for contact with the rotor core.

The coating 330 includes a resin 310 and filler 320. The resin 310 and the filler 320 may be selected for compatibility with each other as well as to provide desired electrical, thermal, and/or mechanical properties, as well as compatibility or adhesion to the metallic support member 340. In various embodiments, the coating 330 may be comprised of between 50 and 65 percent resin 310 by weight, or be comprised of between 35 and 50 percent of filler 320 by weight.

The resin 310 (or varnish) is configured to provide a coatable substance into which the filler 310 may be mixed for subsequent application to one or more sides of the metallic support layer 340. It may be noted that, in various embodiments, the resin 310 may undergo a transformation or change during the formation of the slot liner. For example, the resin 310 may be provided in an initial form and mixed, in the initial form, with the filler 320 to provide the coating 330. The coating 330 may then be applied to the metallic support member 340. After the coating 330 is applied to the metallic support member 340, the coated substrate or support layer may be cured, for example in a vacuum oven. During the curing process, the resin 310 may cure or transform to a different form or substance. For example, the resin 310 may transform from a precursor to a final form. In some embodiments, the resin 310 may be provided in an initial form of or including a polyimide precursor (e.g., polyamic acid), and, after curing, be in a final form of or including a polyimide resin. (As used herein, a polyimide may be understood as a polymer of imide monomers.) The particular resin selected may be configured or selected, for example, at least in part based on ability to bond with the filler 320 and compatibility with the filler 320.

Generally, the filler 320 may be selected to provide the slot liner 300 with a relatively high thermal conductivity (e.g., 1.5 W/(m*K) or more, or 10 times the thermal conductivity of conventional slot liners), while still providing a desired amount of electrical insulation and/or dielectric strength. In some embodiments, the filler 320 may thus be understood as a high thermal conductivity electrical insulating (HTCEI) filler. The filler 320, for example, may comprise particles of one or more of boron nitride, aluminum nitride, or a diamond material (e.g., diamond powder). Additionally, due to the thermal conductivity of the metallic support member 340, substances such as aluminum oxide may be employed that do not provide as high of thermal conductivity as boron nitride, for example. In some embodiments, the filler 320 may include boron nitride particles sized between 10 nanometers and 100 microns. For example, in some embodiments, the filler 320 may include boron nitride particles sized between about 10 nanometers and 300 nanometers. As another example, the filler 320 may include boron nitride particles sized between about 50 nanometers and 50 microns. The particular sizes used may be selected, for example, to provide a balance or trade-off between desired mechanical and thermal properties. For example, for a given application, a larger particle size may provide improved thermal conductivity, but may provide reduced mechanical capability, while a smaller particle size may provide improved mechanical capability while still providing sufficient (albeit lower) thermal conductivity than the larger particle size.

As shown in FIG. 3, the resin 310, filler 320, and metallic support member 340 may be utilized to produce the slot liner 300. In the depicted embodiment, at 302, the metallic support member 340 is provided along with the resin 310 and filler 320. The resin 310 may be in a precursor stage at 302. At 304, the resin 310 (e.g., still in the precursor stage) may be mixed with the filler 320 to provide the coating 330. At 306, the coating 330 is applied to at least one side of the metallic support member 340 to provide slot liner material 350. It may be noted that the coating 330 may be applied in a series of relatively thin (e.g., about 1 mil) coats or layers to the metallic support member. As used herein, a thickness of about 1 mil (or other thickness value) means within 10% of 1 mil (or other thickness value).

Such application of a series of coats may improve electrical breakdown resistance or dielectric strength in various embodiments. In the illustrated embodiment, the coating 330 is not applied to the first side 342, and is applied to the second side 344 of the metallic support member 340.

The slot liner material 350 may be provided for example, in the form of a sheet. For example, a sheet of stainless steel may be coated with the coating 330. The slot liner material 350 may next be cured. During the curing, a material of the resin 310 may change form or stage. For example, the resin 310 may be comprised of a polyamic acid before curing, and a polyimide after curing. In various embodiments, the resin 310 is configured to provide for mixing and coating in the precursor stage, while providing desired mechanical and/or other properties in the post-curing stage. After curing, the slot liner material 350 may be formed into the slot liner 300 (or a plurality of slot liners 300). For example, the slot liner material 350 may be formed as a sheet, cured, and cut into strips that are subsequently formed (e.g., in a press using pressure, or pressure along with heat) into a desired shape.

In FIG. 3, at 308, a generally V-shaped slot liner 300 is depicted. The slot liner 300, for example, may be sized and configured to be accepted by a slot 116 of the rotor core 110 of the stator assembly 100. It may be noted that the slot liner 300 need not necessarily be rigid, and may be pliable or flexible when outside of the slot. The particular bends in the slot liner 300 generally correspond to bends or angles in the slot for convenient and accurate placement and positioning of the slot liner 300 in the slot. The slot liner material 350 and resulting slot liner 300 may have a thickness of about 5 mil (0.005 inches) in various embodiments. For example, the metallic support member 340 may have a thickness of about 2-3 mil, and the coating 330 may have a thickness of about 3-5 mil. As one example, the metallic support member may have a thickness of 2 mil, and the coating 330 may include 3 coats of 1 mil thickness each for a total coating thickness of 3 mil, and a total slot liner thickness of 5 mil. It may be noted that the particular geometry (e.g., size, shape) of the slot liner 300 depicted in FIG. 3 is provided by way of example for illustrative purposes, and that other sizes, shapes, or arrangements of slot liners may be employed in alternate embodiments, for example to correspond to different shapes and sizes of slots. By way of example, slot liners may be "U" or "L" shaped, have multiple or compound bends, and/or have rounded features or bends in various embodiments In the embodiment depicted in FIG. 3, the coating 330 is disposed on one side (e.g., second side 344) but not the other side (e.g., first side 342) disposed opposite the coated side. The second side 344 may be understood as a "coated side" and the first side 342 may be understood as an "uncoated side." Providing coating on only side of the metallic support member 340 may help reduce or minimize production or manufacturing costs in various embodiments. Thus, in various embodiments, the coating 330 may be disposed on a coated side but not a side opposite the coated side of the metallic support member 340. The coated side of the metallic support member may be oriented toward the windings (e.g., the coated side is interposed between the metallic support member and the windings), and the uncoated side may be interposed between the coated side and the rotor core. The coated side thus provides electrical insulation between the windings and the rotor core, as well as between the windings and the metallic support member 340.

It may be noted that in various embodiments, the metallic support member 340 may have an edge that extends from at least one side of the metallic support member. The edge may be oriented toward the windings when the slot liner 300 is positioned in a slot. Accordingly, the edge may be provided with electrical insulation to prevent electrical breakdown, or to prevent the conduction of electrical current from the windings to the rotor core via the metallic support member. In some embodiments, the edge may be covered with one or more coats of the coating 330 to provide electrical insulation as well as thermal conductivity. However, because the edge may make up a relatively small amount of the contact surface between the windings and the slot liner 300, the edge may be covered with an electrical insulator that does not provide the thermal conductivity of the coating 330 to reduce cost and/or complexity of producing the slot liner 300. For example, the edge may be covered with an insulating tape adhesively secured to the edge, instead of being coated with the coating 330. For example, as best seen in view 3-3 of FIG. 3, the metallic support member 340 of the slot liner 300 includes an edge 360 that extends from the first side 342 (e.g., the uncoated side) and the second side 344 (e.g., the coated side). As seen in FIG. 3, including View 3-3, the slot liner 300 extends past a rotor core 380, with windings 390 shown in dashed line. In various embodiments, the slot liner 300 may extend past the rotor core 380 in one or more directions about ⅛", for example to help prevent direct contact between the windings 390 and the rotor core 380. An insulating tape 370 is shown covering the edge 360 (e.g., interposed between the edge 360 and the windings 390), providing insulation between the windings 390 and an uncoated portion (e.g., edge 360) of the slot liner 300 that may otherwise contact or otherwise conduct current from the windings to the rotor core.

Various embodiments thus provide slot liners having desirable mechanical qualities (reliability, strength, capable of being bent 90 degrees (or more, such as 180 degrees) without cracking or with negligible, minimized, or reduced cracking), beneficial electrical qualities (providing sufficient electrical insulation between stator and windings, relatively high dielectric strength, or the like), and relatively high thermal conductivity (e.g., 1.5 W/(m*K) or higher), as well as providing sufficient mechanical qualities for use with a rotor that may be rotating at a relatively high angular velocity. Generally, in various embodiments, the filler (e.g., boron nitride) may help provide desired thermal conductivity and electrical properties, while the metallic support member may help provide mechanical stability for rotor applications, and facilitate convenient forming to a desired size and/or shape.

Figure 4:
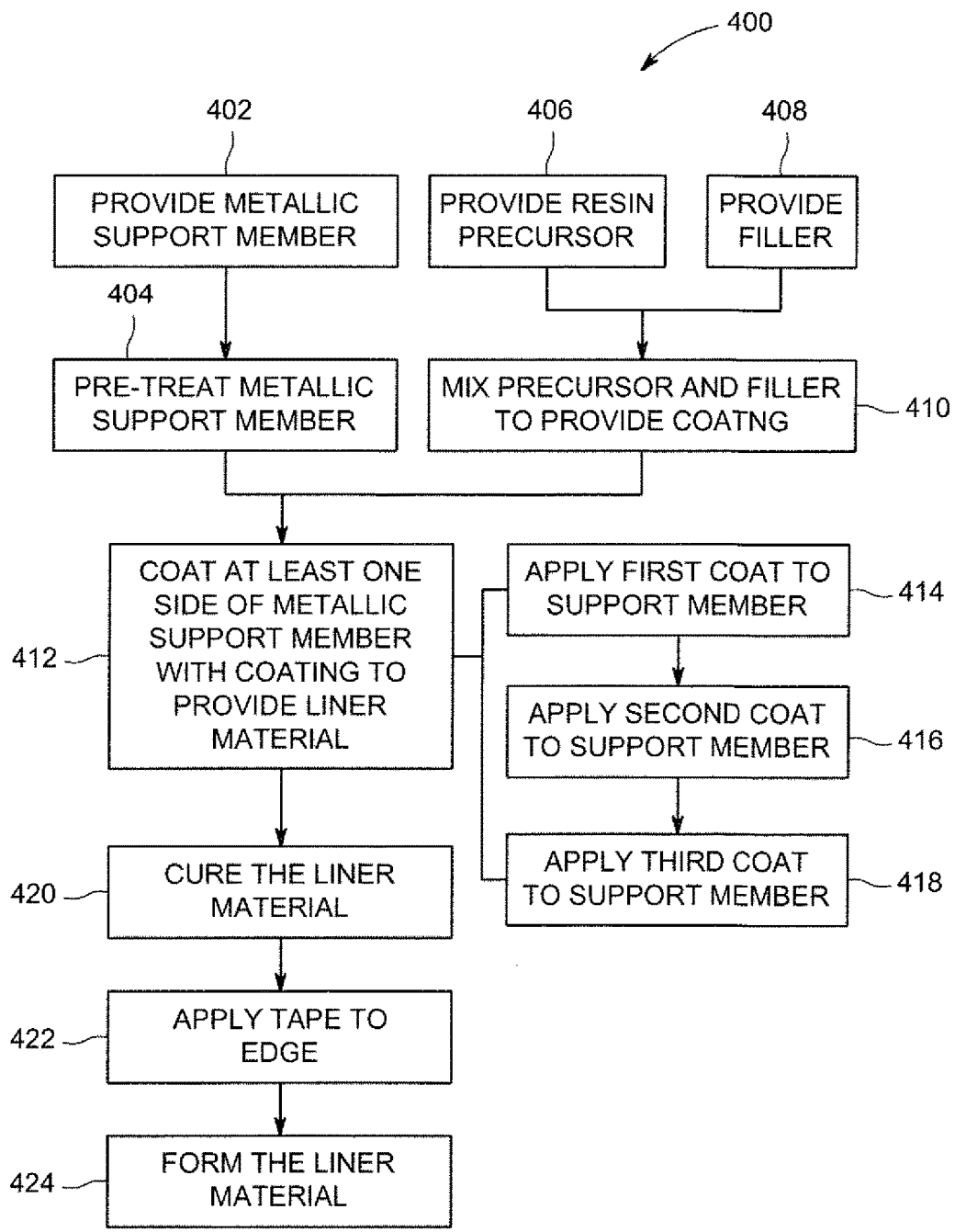
FIG. 4 is a flowchart of a method for providing a slot liner in accordance with various embodiments.

FIG. 4 provides a flowchart of a method 400 for providing a slot liner (e.g., a slot liner for a rotor). In various embodiments, the method 400, for example, may employ structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. It may be noted that the method 400 and flowchart provided in FIG. 4 are provided by way of example for illustrative purposes.

In the illustrative and non-limiting illustrated embodiment, at 402, a metallic support member is provided. For example, the metallic support member (e.g., metallic support member 340), may be formed using stainless steel, such as 316 stainless steel with a soft temper (e.g., provided via heat treatment). As additional examples, copper or brass may be utilized. As still further additional examples, cobalt alloys or nickel alloys may be employed as metallic support members. Generally, the material for the metallic support member may be selected to provide desired mechanical properties (e.g., strength, flexibility, reliability, resistance to tearing, or the like) and thermal conductivity. The metallic support member may have a thickness of about 2-3 mils.

At 404, the metallic support member is pre-treated. The pre-treatment is performed in various embodiments to clean the metallic support member and/or to provide improved bonding or adhesion of the coating to the metallic support member. For example, for stainless steel support members, the metallic support member may be pre-treated by washing with an alkali material (e.g., and alkaline solution), rinsing with one or more rinses of de-ionized water, and dried. For example, 2-3 rinses with de-ionized water may be performed in various embodiments. The alkaline solution may be a relatively strong base or alkali configured to remove grease or other residue from the metallic support member (or at least a side of the support member to be provided with the coating).

At 406, a resin precursor is provided. The resin precursor is configured for ready and convenient mixing with a filler and subsequent coating onto the metallic support member (e.g., after the metallic support member is pre-treated). The resin precursor in various embodiments may be a polyimide resin precursor, such as polyamic acid, that becomes the polyimide after curing.

At 408, a filler is provided. For example, the filler may be a HTCEI filler as discussed herein. In various embodiments, the filler may include particles of at least one of boron nitride, aluminum nitride, or a diamond material. For example, in some embodiments, the filler may include particles of boron nitride sized within a range of between 10 nanometers and 100 microns. As another example, the filler may include particles of boron nitride sized within a range of between 100 nanometers and 300 nanometers.

At 410, the precursor and filler are mixed to provide a coating. In some embodiments, the precursor may comprise between 50 and 65 percent of the mixture by weight. The filler may comprise between 35 and 50 percent of the mixture by weight in various embodiments.

At 412, the coating is applied to at least one side of the metallic support member to provide liner material (e.g., slot liner material 350). In various embodiments, the coating may be applied to both sides of a metallic sheet, for example. In some embodiments, multiple coats may be applied. To reduce manufacturing or production costs, the multiple coats may be applied to only one side of the metallic support member. For example, coating one side of the metallic support member may include providing plural coats sequentially applied on top of each other. For example, a series of coats (e.g., 3) each having a thickness of about 1 mil may be employed in various embodiments. Utilizing sequentially applied coats, instead of just one coat having the same thickness as the sum of the sequentially applied coats, may provide improved electrical characteristics of the coating. For example, single, relatively thick layers may have a larger amount and/or size of bubbles (e.g., air bubbles) formed in the coating. Multiple, relatively thin layers, on the other hand, may have smaller amounts and/or sizes of bubbles, and provide more robust electrical insulation. For example, a series of three coats having the same overall thickness as a single coat (e.g., three coats of 1 mil each in contrast to a single 3 mil thick coat) may have a breakdown voltage about ten times higher than that of the single coat. The series of coats may be applied as part of a casting process using different blade gaps for each layer (e.g., a progressively larger gap for each subsequent coat). The blade gap is generally larger than the coat thickness (e.g., 5-10 times the desired thickness) to help account, for example, for evaporation (e.g., evaporation of solvent) during drying of a particular layer or coat (e.g., evaporation during drying of a coat before a subsequent coat is applied). The coating may be applied in some embodiments in a series of substeps, for example substeps 414, 416, and 418 as shown in FIG. 4.

At 414, a first coat of the coating is applied to the substrate or metallic support member. The first coat may be applied, for example, using a knife blade coater set at a first thickness. For example, a blade gap of about 5 mil may be utilized to provide a first coat having a desired thickness of about 1 mil. The application of a first coat 522 to a metallic support layer 510 is schematically depicted at 502 of FIG. 5. The first coat may be allowed to dry before a subsequent coat is applied.

Figure 5:
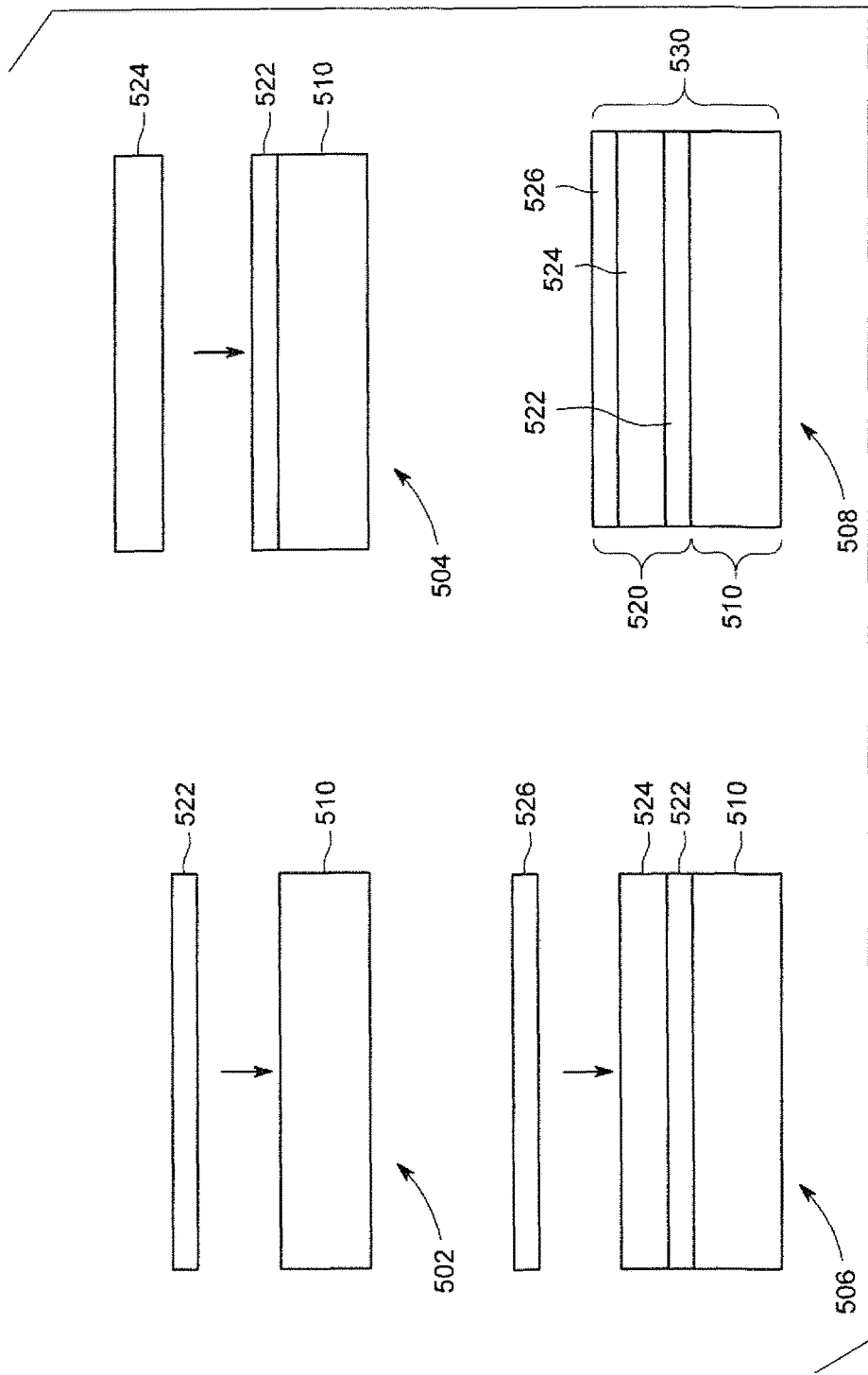
FIG. 5 illustrates a coating process in accordance with various embodiments.

Returning to FIG. 4, at 416, a second coat is applied on top of the first coat. The application of a second coat 524 on top of the first coat 522 is schematically depicted at 504 of FIG. 5. The second coat may be applied, for example, using a knife blade coater set at a second thickness that is greater than the first thickness used at 414. For example, a blade gap of about 10 mil may be utilized to provide a second coat having a desired thickness of about 1 mil on top of the first coat. As seen in FIG. 5, the first coat 522 is interposed between the second coat 524 and the metallic support member 510. The second coat may be allowed to dry before a third coat is applied.

Returning to FIG. 4, at 418, a third coat of the coating is applied on top of the second coat. The application of a third coat 526 on top of the second coat 524 is depicted schematically at 506 of FIG. 5. The third coat may be applied, for example, using a knife blade coater set at a third thickness that is greater than the second thickness used at 416. For example, a blade gap of about 15 mil may be utilized to provide a third coat having a desired thickness of about 1 mil on top of the second coat. As seen in FIG. 5, the second coat 524 is interposed between the third coat 526 and the metallic support member 510 and first coat 522. At 508, after the application and drying of the third coat 526, the slot liner material 530 is shown including the metallic support member 510 as well as the coating 520 (including first coat 522, second coat 524, and third coat 526). The slot liner material 530 may be provided as a sheet that is cut into strips to provide a plurality of slot liners. It may be noted that the examples discussed herein are provided by way of example for illustrative purposes, and that other numbers and/or thickness of coats, for example, as well as alternative coating or casting processes, may be utilized in various embodiments.

Returning again to FIG. 4, at 420, the liner material (e.g., liner material 350, liner material 530) is cured. For example, the slot liner material may be in the form of a sheet (e.g., a sheet of a metallic support member having one or more coats of coating disposed thereon), and the sheet may be placed in a vacuum oven for curing. In some embodiments, the liner material may be imidized, or polyimide precursor may be cured into polyimide. The liner material may be cured, for example, at about 250 degrees Celsius, or, as another example, at about 300 degrees Celsius. During curing or imidization, water vapor may be released. The curing may be performed under the influence of a vacuum (e.g., in a vacuum oven) to help reduce or avoid the formation of microvoid formations in the liner material that may be caused by water vapor release. Additionally or alternatively, the vacuum oven may be purged during the curing with nitrogen gas, for example, to prevent or reduce oxidization at relatively high temperatures.

At 422, an electrically insulating tape is applied to one or more exposed (e.g., uncoated) edges of the slot liner. For example, an edge of the metallic support member that may be near to or in contact with windings when installed in a slot may be covered with an insulating tape. The tape may have an adhesive side that is applied to the edge. In some embodiments, one or more coats or layers of the coating may be applied to the edge. Use of the tape (e.g., a KAPTON® tape) may not provide the thermal conductivity as the coating, but may help reduce production or manufacturing costs associated with electrically insulating an edge.

At 424, the liner material is formed into one or more liner slots. For example, the liner material (or a portion thereof) may be formed into a shape configured to be accepted by a slot of a stator. The slot liner, for example, may have a shape similar to or complimentary the shape of the slot, but may, for example, be differently sized. For example, a V-shaped slot liner may be placed in a V-shaped slot, but the legs or size of the slot liner may be longer than the legs of the slot, such that the legs of the slot liner extend beyond the edge of the slot (e.g., toward an interior or bore of a rotor, and/or past a portion of the rotor in an axial direction). The liner material, for example, may be bent to a desired shape via the application of heat and pressure to the liner material (e.g., in a heated press). The particular values of the parameters used in forming (e.g., amount of pressure) may be varied, for example, based on thickness of the slot liner. In some embodiments, a cured sheet of liner material may be cut into strips or other portions, with the strips or other portions subsequently bent or otherwise formed into slot liners. It may be noted that in some embodiments, the slot liner may be pre-formed at a location remote from the rotor (e.g., pre-formed before an installation process), while in other embodiments the slot liner may be provided in a generally flat state that is bent to shape or otherwise formed during installation into a slot.

Figure 6:
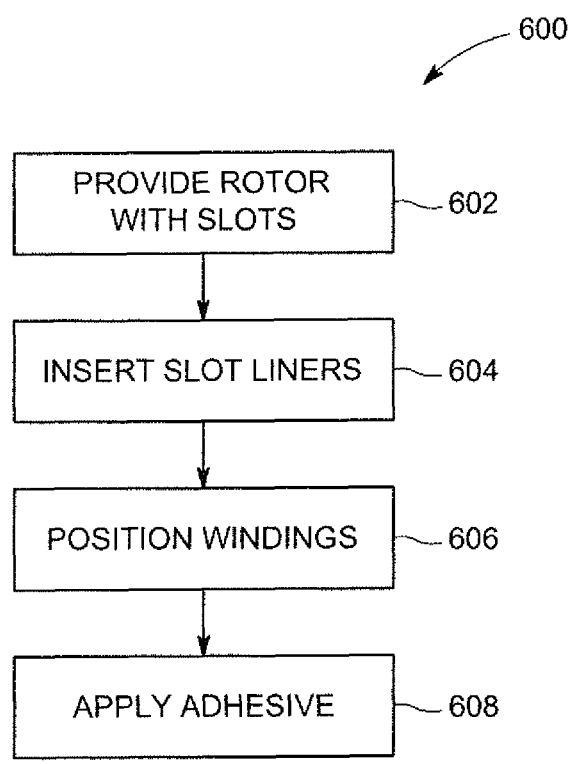
FIG. 6 is a flowchart of a method for providing a rotor assembly for a power system in accordance with various embodiments.

FIG. 6 provides a flowchart of a method 600 for providing a rotor assembly. In various embodiments, the method 600, for example, may employ structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. It may be noted that the method 600 and flowchart provided in FIG. 6 are provided by way of example for illustrative purposes.

In the illustrative and non-limiting illustrated embodiment, at 602, a rotor having slots is provided. The rotor, for example, may have a rotor core (e.g., rotor core 110) having arms and slots extending from a central or interior portion of the rotor core. The rotor core may be made of metal (e.g., laminated metal). The slots may be configured for the placement or positioning of conductors (e.g., copper windings) that surround the arms.

At 604, slot liners (e.g., slot liners 140, slot liners 300) are inserted into the slots. The slot liners may be pre-formed to have a shape corresponding to the shape of the slots into which the slot liners are to be inserted. The slot liners are configured to be interposed between the windings and the rotor (e.g., a rotor core or body of the rotor) and to provide electrical insulation between the rotor and the windings. Further, in various embodiments as disclosed herein, the slot liners also provide for relatively high thermal conductivity between the windings and the rotor body, thereby allowing for improved removal of heat from the windings and improved power density.

At 606, windings are positioned. The windings are configured for the passage of electric current therethrough. The windings, for example, may be made of copper. The windings may be wound about the arms of the rotor and through the slots, with the slot liners interposed between the windings and the rotor arms.

At 608, an adhesive is applied. For example, the rotor assembly, with the slot liners and windings in place, may be dipped or soaked in a varnish or other adhesive, in order to help secure and maintain the various components of the rotor assembly together. The rotor assembly may then be used in assembling a power system such as a motor or generator (e.g., the rotor assembly may be disposed within the bore of a stator assembly; the stator assembly may be mounted to a housing; electrical connections may be made between the windings and power sources, control systems, or the like).

Thus, various embodiments provide for improved power density, for example by allowing higher current through windings and/or more effectively removing heat from the windings. As discussed herein, various embodiments provide for improved slot liners having increased thermal conductivity for improved heat transfer from rotor windings, while still providing desirable mechanical and electrical characteristics, including sufficient mechanical strength to withstand the rigors of rotor applications.

It should be noted that the particular arrangement of components (e.g., the number, types, placement, or the like) of the illustrated embodiments may be modified in various alternate embodiments. For example, in various embodiments, different numbers, sizes, or shapes of a given component or aspect may be employed.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal language of the claims.

What is claimed is:

1. A slot liner for a rotor assembly of a power system, the slot liner comprising:
   a metallic support member; and a coating disposed on a coated side but not on an uncoated side of the metallic support member, the coating comprising a mixture of
  a high thermal conductivity electrical insulating (HTCEI) filler, the HTCEI filler comprising particles of at least one of boron nitride, aluminum nitride, or a diamond material; and
  a polyimide resin,
  wherein the coated side is configured to be oriented toward a winding of the rotor assembly and the uncoated side is disposed opposite the coated side and configured to be interposed between the coated side and a rotor core of the rotor assembly.

2. The slot liner of claim 1, wherein the metallic support member is formed from stainless steel.

3. The slot liner of claim 2, wherein the metallic support member is formed from grade 316 stainless steel that has been heat treated to provide a soft temper.

4. The slot liner of claim 1, wherein the coating comprises multiple layers of the mixture.

5. The slot liner of claim 1, wherein the particles of the filler comprise boron nitride particles having a size between 10 nanometers and 100 microns.

6. The slot liner of claim 1, wherein the metallic support member comprises an edge that extends from the at least one side, wherein the coating is not disposed on the edge, the slot liner further comprising an electrically insulating tape disposed on the edge.

7. A rotor assembly for a power system, the rotor assembly comprising:
  a rotor core having arms extending from a central portion and defining slots therebetween;
  windings passing through the slots, each winding disposed about a corresponding arm; and
  slot liners disposed in the slots and interposed between the windings and the rotor core, where the slot liners comprise:
    a metallic support member; and
    a coating disposed on a coated sided but not on an uncoated side of the metallic support member, the coating comprising a mixture of
      a high thermal conductivity electrical insulating (HTCEI) filler, the HTCEI filler comprising particles of at least one of boron nitride, aluminum nitride, or a diamond material; and
      a polyimide resin,
      wherein the uncoated side of the metallic support member is disposed opposite the coated side and interposed between the coated side and the rotor core, and the coated side is interposed between the metallic support member and the windings.

8. The rotor assembly of claim 7, wherein the metallic support member comprises an edge that extends from the at least one side, wherein the coating is not disposed on the edge, the slot liner further comprising an electrically insulating tape disposed on the edge.

9. The rotor assembly of claim 7, wherein the particles of the filler comprise boron nitride particles having a size between 10 nanometers and 100 microns.

10. A method comprising:
  providing a metallic support member, a polyimide resin precursor, and a high thermal conductivity electrical insulating (HTCEI) filler, the HTCEI filler comprising particles of at least one of boron nitride, aluminum nitride, or a diamond material;
  mixing the polyimide resin precursor and the HTCEI filler to provide a coating;
  coating a coated side but not an uncoated side of the metallic support member with the coating to provide a liner material, wherein the uncoated side of the metallic support member is disposed opposite the coated side and configured to be interposed between the coated side and a rotor core, and the coated side is configured to be interposed between the metallic support member and windings; and
  curing the liner material.

11. The method of claim 10, further comprising forming the liner material into a shape configured to be accepted by a slot of a rotor assembly.

12. The method of claim 10, wherein the metallic support member comprises an edge that extends from the at least one side, wherein the coating is not disposed on the edge, further comprising applying an electrically insulating tape to the edge of the metallic support member.

13. The method of claim 10, wherein coating the at least one side of the metallic support member comprises providing plural coats sequentially applied on top of each other.

14. The method of claim 13, wherein coating the providing plural coats comprises providing at least three coats having a thickness of about 1 mil each.

15. The method of claim 10, further comprising pre-treating the at least one side of the metallic support member before coating the at least one side of the metallic support member with the coating.

16. The method of claim 10, where pre-treating the at least one side of the metallic support member comprises:
  cleaning that at least one side with an alkali material; and
  rinsing the at least one side with de-ionized water.

17. The method of claim 10, wherein the particles of the filler comprise boron nitride particles having a size between 10 nanometers and 100 microns.

* * * * *